US010169787B2

(12) United States Patent
Scrivner

(10) Patent No.: US 10,169,787 B2
(45) Date of Patent: *Jan. 1, 2019

(54) METHOD, MEDIUM, AND SYSTEM FOR SESSION BASED SHOPPING

(71) Applicant: PAYPAL, INC., San Jose, CA (US)

(72) Inventor: Michael Gene Scrivner, Omaha, NE (US)

(73) Assignee: PAYPAL, INC., San Jose, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 15/005,556

(22) Filed: Jan. 25, 2016

(65) Prior Publication Data
US 2016/0140631 A1 May 19, 2016

Related U.S. Application Data

(63) Continuation-in-part of application No. 13/537,560, filed on Jun. 29, 2012, now Pat. No. 9,262,739.

(51) Int. Cl.
G06Q 30/00 (2012.01)
G06Q 30/06 (2012.01)
H04L 29/08 (2006.01)
G06Q 20/12 (2012.01)
(Continued)

(52) U.S. Cl.
CPC ....... G06Q 30/0601 (2013.01); G06Q 10/083 (2013.01); G06Q 10/0875 (2013.01); G06Q 20/12 (2013.01); G06Q 30/0207 (2013.01); G06Q 30/0251 (2013.01); G06Q 30/0253 (2013.01); H04L 67/14 (2013.01); H04L 67/146 (2013.01)

(58) Field of Classification Search
CPC .......... G06Q 20/3674; G06Q 30/0601; G06Q 30/0207; G06Q 30/0251; G06Q 30/0253; G06Q 10/083; G06Q 10/0875; H04L 67/14; H04L 67/146
See application file for complete search history.

(56) References Cited

U.S. PATENT DOCUMENTS 7,188,181 B1 * 3/2007 Squier ..................... G06F 21/41
709/228
2007/0088629 A1 * 4/2007 Hodson .................. G06Q 30/06
705/26.81

(Continued)

OTHER PUBLICATIONS

Nov. 2001—http://www.perlmonks.org/bare/7node_icU126536 (Year: 2001).*

(Continued)

Primary Examiner — Matthew E Zimmerman
(74) Attorney, Agent, or Firm — Haynes and Boone, LLP

(57) ABSTRACT

The present disclosure involves systems and methods of communicating between devices in a shopping session. In one aspect, a method includes receiving a session identifier associated with a shopping session of a user, the session identifier being generated based on a hash created from a shopping location and at least one other value associated with the shopping session. The method further includes notifying an electronic shopping system associated with the shopping location about a selected product from the shopping session based on the session identifier. The receiving and the notifying are each performed by a computing system.

20 Claims, 10 Drawing Sheets

(51) Int. Cl.
*G06Q 10/08* (2012.01)
*G06Q 30/02* (2012.01)

(56) References Cited

U.S. PATENT DOCUMENTS

2012/0123924 A1* 5/2012 Rose .................. G06Q 20/12
 705/35
2012/0158589 A1* 6/2012 Katzin ................ G06Q 20/12
 705/44

OTHER PUBLICATIONS http://www.vbulletin.com/forum/forum/general/php-html-questions/61720-best-way-to-generate-random-unique-session-id-s (Year: 2002).*

* cited by examiner

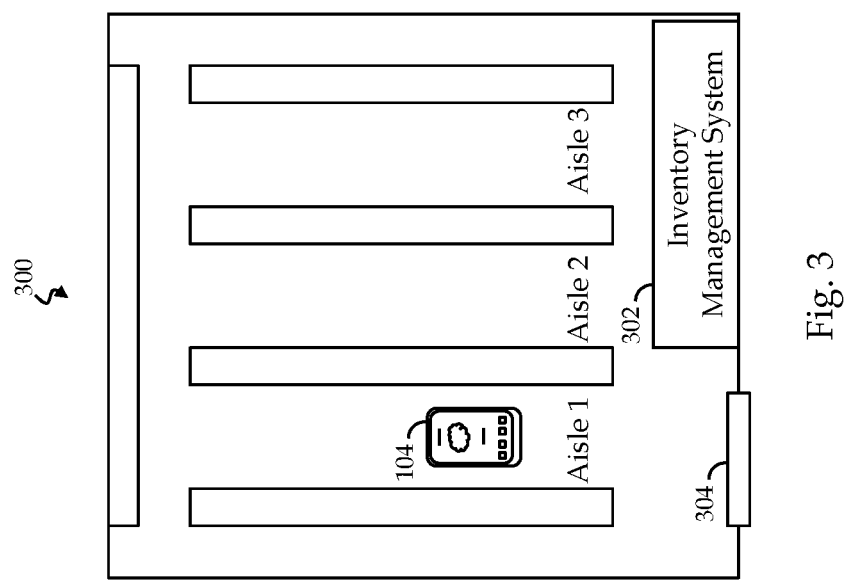

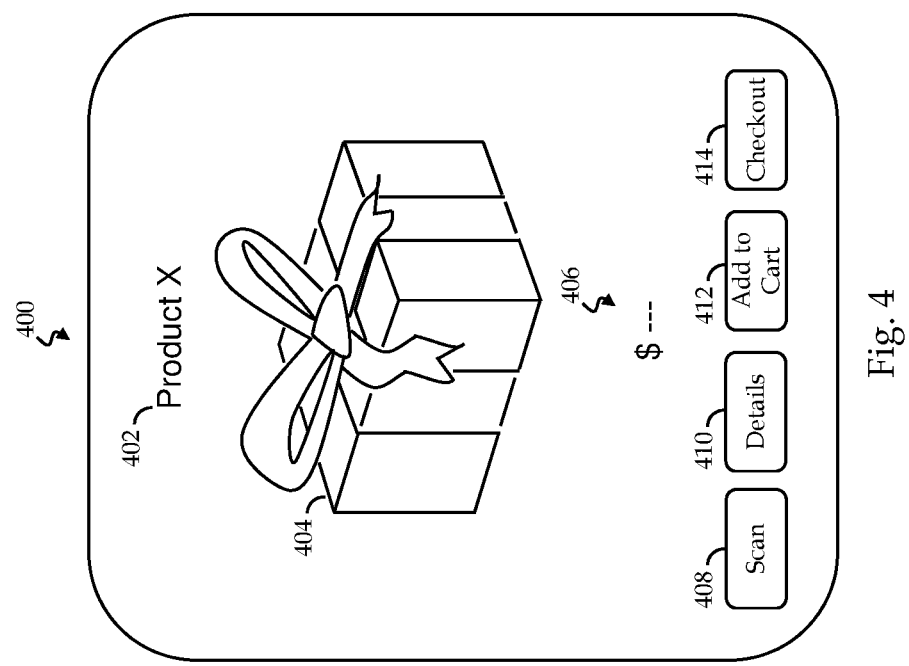

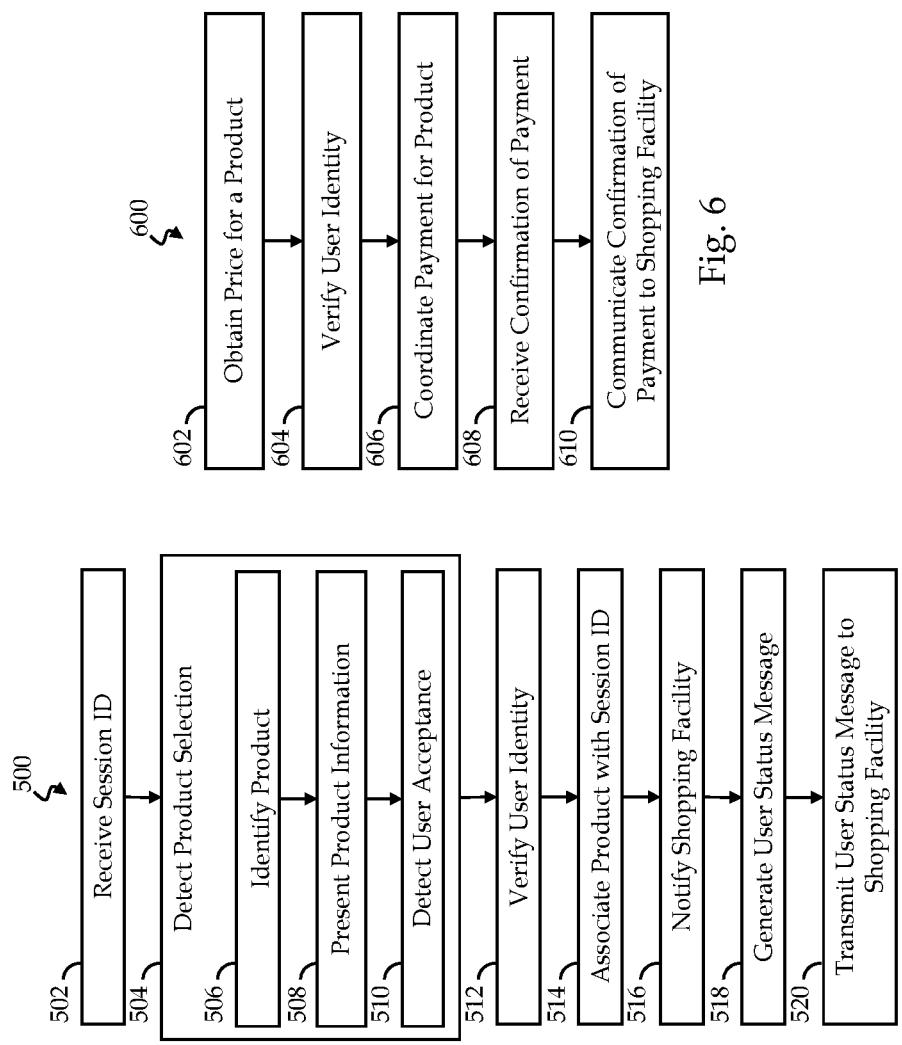

METHOD, MEDIUM, AND SYSTEM FOR SESSION BASED SHOPPING

PRIORITY INFORMATION

The present application is a continuation of application Ser. No. 13/537,560, filed on Jun. 29, 2012, entitled "METHOD, MEDIUM, AND SYSTEM FOR SESSION BASED SHOPPING," which is incorporated by reference herein in its entirety.

BACKGROUND

1. Technical Field

The present disclosure generally relates to conducting electronic transactions and, more particularly, to making and verifying purchases using a portable electronic device in communication with a commerce infrastructure.

2. Related Art

Advances in electronic commerce have not eliminated traditional physical "brick and mortar" stores. If anything, advancing technology has improved the experience delivered by physical stores by enabling improvements resulting in greater product availability, better inventory management, and reduced operating costs. However, consumers' expectations have risen as well. Consumers expect convenience, value, and personal service, all of which present a challenge for physical and virtual stores alike. One particular area of concern is the checkout process. It has proven to be no small challenge to complete checkout transactions swiftly, accurately, and effectively and to provide protection against error and theft.

Therefore, while existing methods and systems for customer checkout and point-of-sale transactions have been generally adequate for their intended purposes, they have not been entirely satisfactory in every aspect. Retailers and customers alike benefit from improvements to the efficiency and accuracy of the checkout process as well as from improvements that safeguard against product loss.

BRIEF DESCRIPTION OF THE DRAWINGS

FIG. 3 is a block diagram illustrating a shopping facility according to aspects of the present disclosure.

FIG. 4 is an illustration of an electronic interface of a shopping application according to aspects of the present disclosure.

FIG. 5 is a flowchart of a method for performing a commercial transaction according to aspects of the present disclosure.

FIG. 6 is a flowchart of a method for conducting a purchase transaction according to aspects of the present disclosure.

DETAILED DESCRIPTION

Figure 1:
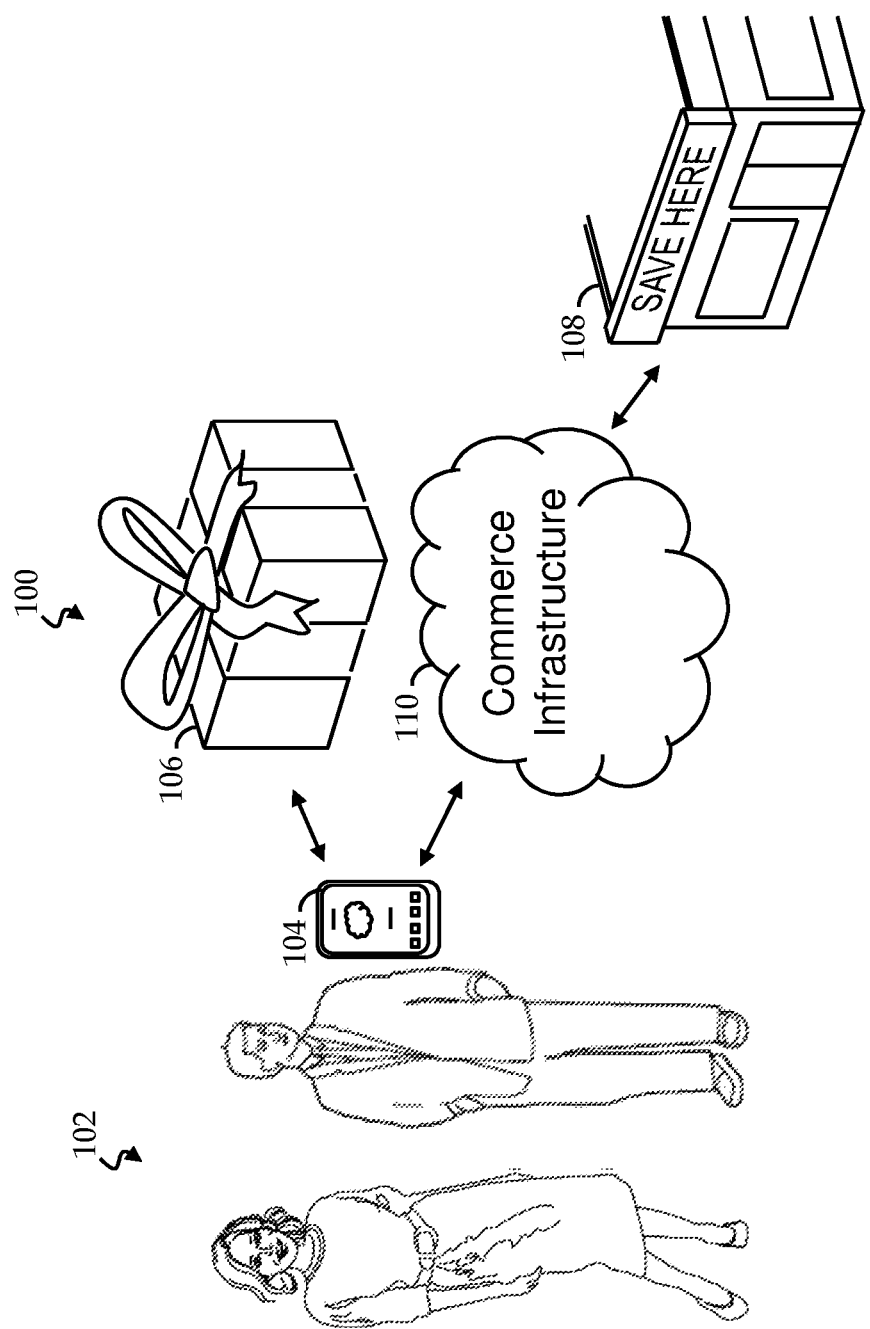
FIG. 1 is a block diagram illustrating an exemplary context in which a commercial transaction is made according to aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The traditional shopping experience has changed little over time. Under the traditional model, a customer surveys the merchandise available, selects an item, and brings the item to a point-of-sale for checkout. A point-of-sale system, typically staffed by a cashier, prices the item, often by scanning an optical code such as a Universal Product Code (UPC). Payment is made, and the customer walks out with the purchase. The traditional procedure is far from perfect for either party. For example, the seller faces a complicated logistical task in staffing cashiers. Customer traffic is highly variable. Staffing too few cashiers leads to long waits and may decrease customer satisfaction. Staffing too many cashiers increases labor costs and may necessitate additional oversight to prevent theft. Predicting and responding to fluctuations in the need for cashiers often proves difficult.

The traditional model also holds drawbacks for customers. For example, the customer may be expected to physically transport items through the store. The desirability of this task varies based on item size and weight. As another example, at the point-of-sale, there is no guarantee that a cashier will be ready when the customer is. Delays in checkout queues are common. When checkout finally begins, the customer may face price confusion due to mislabeling, misidentification, or other errors on the part of the customer, the seller, and/or the supplier. Often these errors go unnoticed to the customer's detriment. Thus, improvements to the traditional model may offer benefits in terms of speed, convenience, accuracy, and economy to all parties.

The present disclosure discloses methods and systems for making and verifying purchases. In one embodiment, a commerce infrastructure system comprises a transaction database configured to store transaction information and one or more computer processors in communication with the transaction database. The one or more computer processors are configured to perform: receiving user information indicating the beginning of a shopping session; generating a session identifier corresponding to the shopping session and a user identified by the user information; receiving a selection of a product; associating the product with the session identifier; and notifying an electronic shopping system of the associating of the product with the session identifier.

In another embodiment, a method comprises: receiving user information signifying the start of a shopping session; receiving an electronic session identifier corresponding to the shopping session and a user identified by the user information; determining a selection of a product of a shopping facility; associating the product with the session identifier in response to the determining of the selection; and notifying the shopping facility of the associating of the product with the session. The receiving of the user information, the receiving of the electronic session identifier, the determining, the associating, and the notifying are each performed by a computing system.

Yet another embodiment involves an apparatus comprising a non-transitory, tangible machine-readable storage medium storing a computer program, wherein the computer program contains machine-readable instructions. When executed electronically, the instructions perform: determining a session identifier corresponding to a shopping session; determining a selection of a product; creating an electronic record linking the product and the session identifier in response to the determining of the selection; and transmitting the electronic record to an electronic shopping system. In some applications, a user of a portable electronic device may shop without necessarily filling a cart or even being present at the store. In some applications, a commerce infrastructure allows the store to interface with the user's portable electronic device to speed up the checkout process and, when used in conjunction with an inventory monitor disclosed herein, determine whether the user has paid before he or she exits. These exemplary applications and further applications are disclosed with reference to FIGS. 1-3.

FIG. 1 is a block diagram illustrating an exemplary context 100 in which a commercial transaction is made according to aspects of the present disclosure. A user 102 begins shopping on his or her portable electronic device 104. In the illustrated context, the portable electronic device 104 is configured to assist the user in shopping by facilitating communications between the user 102 and a seller 108 via a commerce infrastructure 110. Exemplary portable electronic devices 104 include cellular communication devices (cell phones), personal digital assistants, tablet computers, laptop computers, and desktop computers. The device 104 may run a set of instructions or an application configured to perform the user's transactions.

In an embodiment, when the user 102 begins shopping, a session ID is received by the portable electronic device 104. The session ID is used to track products purchased and selected to be purchased by the user 102. The composition and function of the session ID is explained in detail below. Once the session ID is received, the user 102 can begin shopping by selecting a product. Products may include physical and tangible goods, including (but not limited to) clothing, electronics, tools, toys, household appliances, books, movies, automotive components, sporting goods, groceries, etc. Products may also include digital goods, which include goods that are stored, delivered, and/or used in an electronic format. Non-limiting examples of digital goods include electronic books, digital music, digital images, digital videos, virtual items such as virtual currency and other precious items, etc. In some cases, the product may include a non-tangible element such as a service, a promissory contract, or an opportunity. Products include physical goods, digital goods, intangibles such as services, and any other item of value. In some embodiments, the product is selected by scanning a physical product 106 with the portable electronic device 104. Scanning encompasses a number of possible methods for identifying a product. For example, scanning may include scanning a barcode located on the product 106 with a barcode reader integrated into the portable electronic device 104. In another example, scanning includes imaging the product 106 with a digital camera integrated into the portable electronic device 104 and identifying the product from the image. Scanning a product 106 may be done at the seller's store, a competing store, or at another other locations such as the user's home. In addition to scanning, in some embodiments, products are selected from an inventory list. A seller (also referred to as a shopping facility herein) 108 may provide the list to the user's portable electronic device 104 via the commerce infrastructure 110. The portable device 104 displays the list to the user 102, who may then select a product from the list. Providing an inventory list allows a user 102 to shop without being at a store or having the product nearby.

Figure 2:
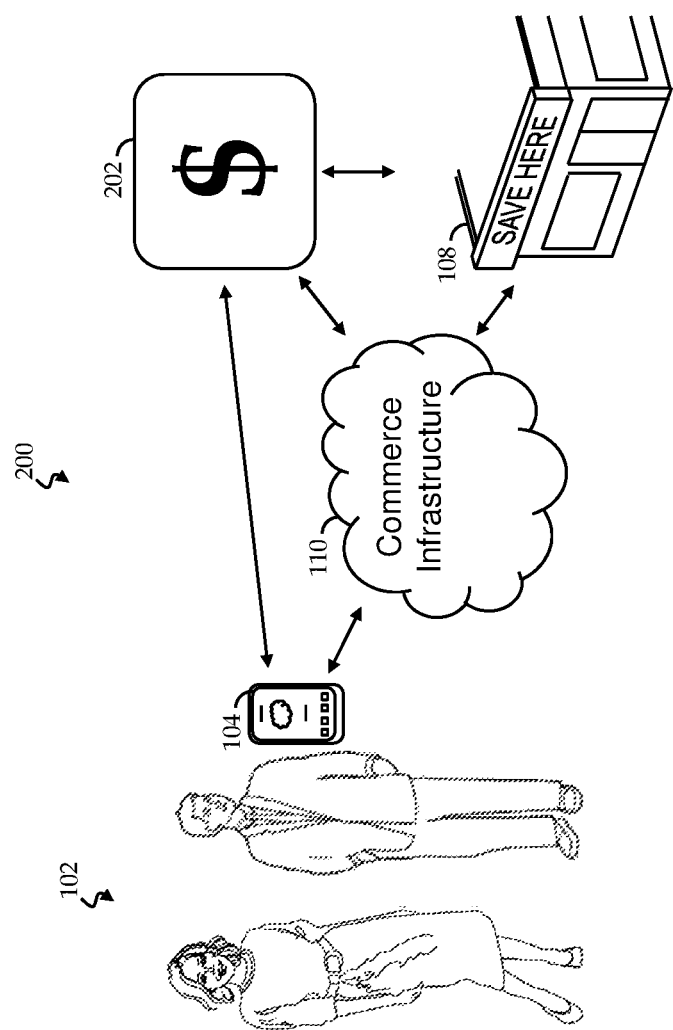
FIG. 2 is a block diagram illustrating an exemplary context in which a commercial transaction is made according to aspects of the present disclosure.

FIG. 2 is a block diagram illustrating an exemplary context 200 in which a commercial transaction is made according to aspects of the present disclosure. After the product is identified and selected, the user 102 may conduct one or more transactions such as such as browsing, carting, and purchasing. Browsing retrieves product information to assist the user in his or her purchasing decision. The user 102 may select a product via the portable electronic device 104 for display or may select multiple products to compare. The device 104 then presents information pertaining to the product or products (e.g., price, manufacturer, weight, contents, stock on hand, etc.) to the user 102. To retrieve this information, the portable electronic device 104 may establish communications with one or more external computing devices such as the commerce infrastructure 110. To add a product to a virtual cart, the user 102 selects a product and requests that the electronic device 104 add the product to the user's cart. The portable electronic device 104 may notify the seller 108 via the commerce infrastructure 110 of the user's selection so that the seller 108 may take action such as retrieving the product and preparing it for sale. The user's selection does not obligate the user to complete the purchase. In some embodiments, the user may unselect the product and remove it from the cart. The portable electronic device 104 may notify the seller 108 of this event. To make a purchase, the user 102 may make or authorize payment for one or more products via the portable electronic device 104. In order to coordinate payment, the device 104 may interface with the seller 108 as well as with one or more third-party payment institutions 202.

FIG. 3 is a block diagram illustrating a shopping facility 300 according to aspects of the present disclosure. A user (not illustrated) and customer of the shopping facility 300 scans products using the portable electronic device 104. The device 104 associates the scanned products with the session ID and reports to an inventory management system 302. In an exemplary embodiment, the user scans products as they are added to his or her cart. When the user is finished, the user may pay for the products via the portable electronic device 104 and/or via another computing system such as the inventory management system 302. In an embodiment, the inventory management system 302 monitors the products in the user's possession as he or she approaches the exit 304. The inventory management system 302 checks the user's products against the products associated with the user's session ID to determine whether the user has paid in full.

In further exemplary embodiments, the user scans products while shopping, but does not need to take immediate possession. For example, in one such embodiment, the inventory management system 302 notifies the seller to retrieve the goods from a warehouse or transfer them to a loading area. Whenever the user is ready to pick up the purchases, he or she may send a status message to the inventory management system 302. In some embodiments, this is done using an interface incorporated into the inventory management system 302. In one such embodiment, the interface is a touchpad located near the exit 304. In other embodiments, the portable electronic device 104 sends the status message to the inventory management system 302. For example, this may be done based on a user input or when the portable electronic device 104 determines that the user has arrived at a designated place such as a store exit or a loading area.

FIG. 4 is an illustration of an electronic interface 400 of a shopping application according to aspects of the present disclosure. In an exemplary embodiment, the shopping application is installed as a module on the portable electronic device 104 and the interface 400 is displayed thereupon. The interface 400 allows the user to view product information as well as to issue instructions to the portable electronic device 104. In various embodiments, the interface provides a product name 402, a product image 404, a price 406, and/or other relevant product information. In some embodiments, the interface provide user commands 408, 410, 412, and 414 that instruct the portable electronic device 104 to take actions including scanning another product, providing additional details on the selected product, adding the selected product to a potential purchase list (or cart), and/or proceeding to checkout.

FIG. 5 is a flowchart of a method 500 for performing a commercial transaction according to aspects of the present disclosure. Additional steps may be performed before, during, and/or after the method 500 and some of the steps described may be removed or replaced in alternate embodiments of the method 500. The method begins in step 502 where a portable electronic device 104 receives a session ID. The session ID may be used to identify goods and services purchased by the user of the device 104 as will be explained in detail below. The session ID may be received in response to one or more triggers. For example, in some embodiments, the session ID is received when a user begins shopping. In some embodiments, the session ID is received when a user initiates a purchase. Further triggers for receiving a session ID include the user entering a store, the user shopping for related products, the user receiving an advertisement, and/or other suitable triggers.

In order to identify the goods and services as well as the purchaser, the session ID may be generated based on a property of the device user, an account holder, a seller, a product, a shopping session, time that the ID is generated, and/or other relevant identifying criteria. In an example, a session ID is generated based on a hash of the user's identity, the store's identity, and a value corresponding to a shopping session. It follows that such a session ID corresponds to the user, the store, and the shopping session and may be used to identify these elements. In a further example where a single account holder has multiple users shopping on multiple portable electronic devices 104 in a single shopping session, multiple session IDs may be generated, each corresponding to and uniquely identifying an account-holder/user/device/session combination.

In step 504, the portable electronic device 104 detects a product selection by the user of the device 104. Referring to step 506, detecting a product selection may include identifying a product. In some embodiments, the portable electronic device 104 detects a product in proximity to the device 104. In some such embodiments, this is performed by scanning the product using a scanning system of the device 104. Exemplary methods of scanning including scanning a radio frequency identification (RFID) tag with an RFID reader incorporated into the scanning system, scanning a barcode with a reader such as a visible laser barcode reader incorporated into the scanning system, imaging the product using a digital camera incorporated into the scanning system, and/or other suitable methods of product scanning and recognition. The portable electronic device 104 may also identify a product by scanning an associated object such as an advertising display or a catalog.

In some embodiments, the portable electronic device 104 does not require any degree of proximity to select a product. For example, in one such embodiment, the portable electronic device 104 receives a listing of one or more products via a transceiver in communication with an external device. An exemplary listing may include a store's entire inventory, sale items, frequently purchased items, and/or targeted suggestions, as well as other types of product listings.

Referring to step 508, detecting a product selection may include presenting product information to the user. In some embodiments, once a potential purchase is identified, product information such as features, price, availability, inventory in stock, comparisons to other products, and/or other product information is presented to the user via a display integrated into the portable electronic device 104. Referring to step 510, detecting a product selection may also include detecting a user acceptance of the product. Detection may include monitoring an I/O interface of device 104 for a user command. In some embodiments, the user's product acceptance is independent of a user's acceptance of a purchase. In other words, merely accepting a product leaves the user the opportunity to cancel or modify the selection before a purchase is made. Ownership need not transfer based on acceptance alone. In alternate embodiments, to speed checkout, a user's acceptance in step 510 also indicates an acceptance of payment. Thus, the payment transaction may proceed based on the user's acceptance without further input.

In step 512, the portable electronic device 104 may attempt to verify the user's identity. Verifying the user's identity may include a login process. In some embodiments, the login process requests and receives a public identifier paired with a private identifier. For example, the login process may utilize a username and password. Other public identifiers include an account name, an email address a phone number, etc. Private identifiers may include a passcode, a graphical pattern, a biometric sample, an audio sample, an image, etc. In further embodiments, the login process receives only a public or only a private identifier. The identifying information such as the public and private pair may be compared against an authoritative record to determine the user's true identity. Other suitable forms of user verification are contemplated and are incorporated in further embodiments.

In step 514, the product selected by the user is associated with the session ID. In an example, association is performed by creating an electronic database entry containing the session ID, a product identifier corresponding to the product, and/or other relevant information such as the time that the entry was created, product details viewed by the user, alternative products considered by the user, and/or time spent considering alternatives. In a further example, the electronic database entry is appended to an existing entry having the same session ID. The existing entry may contain product identifiers corresponding to other goods already selected for purchase. In some embodiments, the product is only associated with the session ID upon a successful verification of the user's identity in step 512.

In step 516, a shopping facility is notified of the association of the session ID and the product. This may include notifying an inventory management system 302 of the shopping facility. Thus, in some embodiments, an electronic record (such as the electronic database entry created in step 514) containing the session ID and a product identifier is provided to the inventory management system 302 by the portable electronic device 104 via the transceiver of the device 104. In some embodiments, notification includes storing the electronic record in a database in accessible by the inventory management system 302. In some embodiments, this notification process occurs in real-time. Alternately, notification may occur at intervals based on time, on number of associated items (e.g., notify on every other product), on further user input, and/or on other criteria such as the processing load on a component of the inventory management system 302 or of the portable electronic device 104.

In step 518, a user status message is generated indicating that the user is ready to receive the product. The user status message may be generated based on a user input, a status condition, and/or any other suitable criteria. For instance, a customer shopping remotely may check-in upon arrival at a store by communicating a user input to the portable electronic device 104. In a further example, the status message is generated when the device 104 detects a geographical location of the user such as the user's arrival at a store or at a loading area. In other instances, a user status message is generated based on other events such as a timeout, the user or an account reaching a preset limit, and/or other suitable events. In step 520, the user status message is transmitted to the shopping facility. In some embodiments, the portable electronic device 104 transmits the user status message to an inventory management system 302 via a transceiver of the device 104. The inventory management system 302 may utilize the user status message for any suitable purpose including to release the product to the customer and/or to alert the shopping facility to prepare the product for delivery (e.g., by retrieving it from a warehouse).

FIG. 6 is a flowchart of a method 600 for conducting a purchase transaction according to aspects of the present disclosure. Additional steps may be performed before, during, and/or after the method 600 and some of the steps described may be removed or replaced in alternate embodiments of the method 600. In step 602, a price is obtained for a product at a portable electronic device 104. In some embodiments, the product is a product selected by a user of the portable electronic device 104 such as may be performed in step 504 of method 500. In an exemplary embodiment, the portable electronic device 104 receives a price from an inventory management system 302 of a shopping facility and displays the price to the user via a visual or auditory display. In another embodiment, the portable electronic device 104 receives a price from a point-of-sale system maintained by a shopping facility. In a further embodiment, the portable electronic device 104 receives a price from a distributer. The price received by the portable electronic device 104 may include any price adjustment such as applicable discounts, taxes, shipping, and/or processing fees and may include offers and discounts on other products.

In step 604, the portable electronic device 104 may attempt to verify the user's identity. In some embodiments, the device 104 attempts to verify a user's identity by a login process that requests and receives a username and password or another public/private information pair. In some embodiments, the login process requests only public or private information. The identifying information may then be checked against an authoritative record stored on the device 104 or externally.

In step 606, payment is arranged and coordinated. In various embodiments, coordinating payment includes conducting price negotiations between the parties, securing authorization from the parties, and/or arranging for the transfer of funds. To negotiate a price, the portable electronic device 104 may transmit offers, bids, and replies as part of offer-and-response negotiations, multi-party negotiations, various types of auctions, and/or other price negotiating scenarios. In some embodiments, this involves exchanging price communications with a commerce infrastructure 110 and/or an inventory management system 302.

In some embodiments, once a price is agreed upon, payment is made by directing funds to the shopping facility. For example, a portable electronic device 104 may transfer electronic currency to an account held by the shopping facility. In some embodiments, payment is made by providing an account coupled with an authorization to debit the account for an amount. For example, a portable electronic device 104 may provide the shopping facility with a credit or deposit account number and an electronic signature authorizing a withdrawal of the purchase price. In some embodiments, payment is made through a third party payment provider. Potential third party payment providers include financial institutions, payment institutions such as PayPal, Inc. and Western Union Financial Services, Inc., escrow agencies, guarantors, and/or other payment facilities.

In step 608, a confirmation of payment is received at the portable electronic device 104. In step 610, the confirmation of payment is provided to the shopping facility. In some embodiments, confirmation of payment is provided to the inventory management system 302.

Figure 7A:
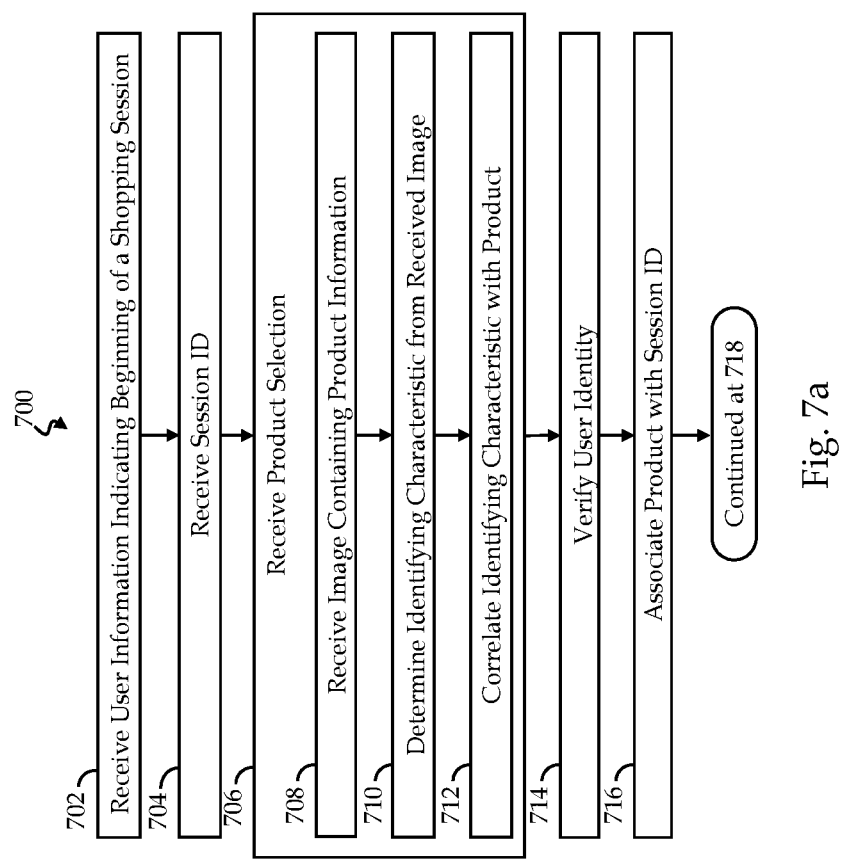
FIGS. 7a and 7b are flowcharts of a method for conducting a commercial transaction according to aspects of the present disclosure.
Figure 7B:
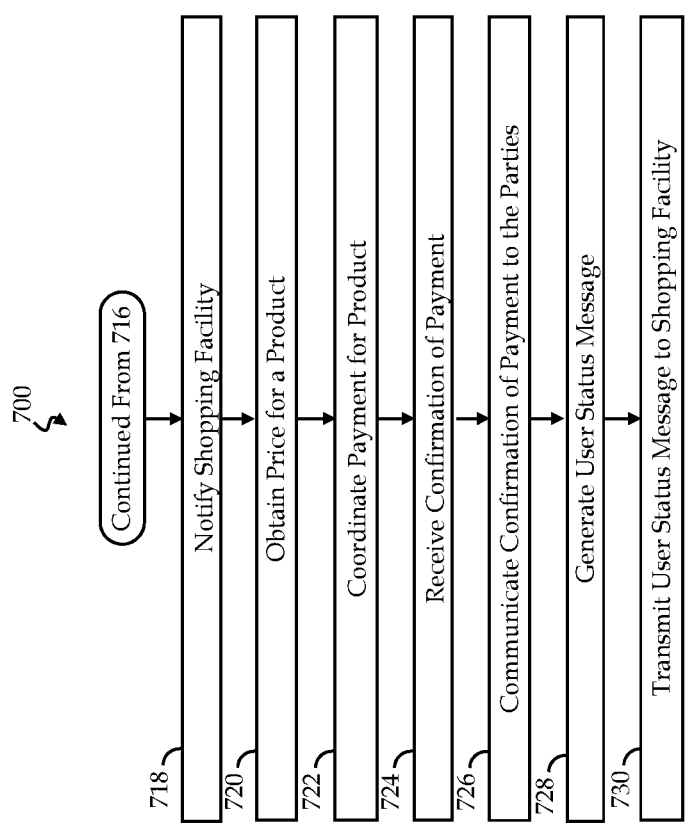

FIGS. 7a and 7b are flowcharts of a method for conducting a commercial transaction according to aspects of the present disclosure. Additional steps may be performed before, during, and/or after the method 700 and some of the steps described may be removed or replaced in alternate embodiments of the method 700. The method is suitable for implementation using a number of computing systems such as, for example, a commerce infrastructure 110. In step 702, user information is received indicating that a new shopping session has begun. In some embodiments, a new shopping session begins when a user enters an input into an electronic device indicating the user's desire to begin shopping. Exemplary user inputs include commands to query a merchant's inventory, to retrieve product information, to initiate a purchase, to view an offer and/or other suitable inputs. In some embodiments, a new shopping session begins when a seller's request is received. For example, a seller may request to extend an offer to a particular user. A new shopping session may also begin based on other triggers such as a previous session reaching a time, value, or other limit. The user information that signals a new shopping session may include information about the user and/or purchaser, information about the seller, product information, offer information such as sales and discounts, information pertaining to the session such as time, value, or other limits, and/or other relevant information.

In step 704, a session ID is received at the commerce infrastructure 110. In various embodiments, the session ID is generated from a property of a device user, an account holder, a seller, a product, a shopping session, time that the ID is generated, and/or other relevant criteria. Thus, the session ID uniquely identifies the respective property or combination of properties. In an example, a session ID is generated from and uniquely identifies a user/seller/shopping session combination. In some embodiments, the relevant properties are obtained from the user information received in step 702.

In step 706, a product selection is received. In an embodiment, a commerce infrastructure 110 receives a product selection by receiving a product identifier such as a stock code, a serial number, a product code such as a universal purchase code (UPC), and/or other identifier from a portable electronic device 104. Referring to step 708, in some embodiments, receiving a product selection includes receiving an image containing product information. In one such embodiment, the received image is captured by a product scanning system sensor of a portable electronic device 104. In step 708, receiving a product selection may include determining an identifying product characteristic from the received image. For example, the commerce infrastructure 110 may determine an identifying product characteristic by decoding a linear code standard (1$d$ barcode) or a matrix code standard (2$d$ barcode) visible in the received image. As another example, the commerce infrastructure 110 may determine an identifying product characteristic by recognizing product packaging. Further examples utilize other identifying steps. In step 710, the identifying characteristic may be correlated with a product. In an embodiment utilizing a UPC value as an identifying characteristic, a database is queried using a UPC value to determine the product correlated with the UPC value.

In step 714, the user's identity may be verified. In some embodiments, the user's identify is verified by a login process. The login process may request and receive any combination public and/or private information such as, but not limited to, a username and password. The identifying information may then be checked against an authoritative record to verify the user's identity.

In step 716, the product indicated by the received product selection is associated with the session ID. In an example, association is performed by creating an electronic database entry containing the session ID, a product identifier corresponding to the product, and/or other relevant information. In a further example, the electronic database entry is appended to an existing entry having the same session ID. The existing entry may contain product identifiers corresponding to other goods already selected for purchase. In some embodiments, the product is only associated with the session ID upon a successful verification of the user's identity in step 714.

In step 718, a shopping facility is notified of the association of the session ID and the product. This may include notifying an inventory management system 302 of the shopping facility. Thus, in some embodiments, an electronic record (such as the electronic database entry created in step 716) containing the session ID and a product identifier is provided to the inventory management system 302 by the commerce infrastructure 110 via the transceiver of the commerce infrastructure 110. In some embodiments, notification includes storing the electronic record in a database in accessible by the inventory management system 302. In some embodiments, this notification process occurs in real-time. Alternately, notification may occur at intervals based on time, on number of associated items (e.g., notify on every other product), on further user input, and/or on other criteria such as the processing load on a component of the inventory management system 302, a component of the commerce infrastructure 110, or a component of the portable electronic device 104.

In steps 720-726, the commerce infrastructure 100 may conduct a purchase transaction. In step 720, a price is obtained for a product. In some embodiments, the product is a product selected by a user such as may be received in step 706 of method 700. In some embodiments, the commerce infrastructure 110 receives a price from an inventory management system 302 of a shopping facility, a point of sale system, a distributer, or other source and transmits the price to a portable electronic device 104 to display to the user. The price received may include any price adjustment such as applicable discounts, taxes, shipping, and/or processing fees and may include offers and discounts on other products.

In step 722, the commerce infrastructure 110 may coordinate payment for the product. In various embodiments, coordinating payment includes conducting price negotiations between the parties, arranging for the transfer of funds, and/or securing authorization from the parties. In some embodiments, the transfer of funds is made by directing funds to the seller. For example, the commerce infrastructure 110 may transfer electronic currency to an account held by a shopping facility. In some embodiments, payment is made by providing an account coupled with an authorization to debit the account for an amount. In some embodiments, payment is made through a third party payment provider such as a financial institution, a payment institution, an escrow agency, a guarantor, and/or another payment facility.

In step 724, a confirmation of payment is received at the commerce infrastructure 110. In step 726, the confirmation of payment is provided to the parties. In some embodiments, confirmation of payment is provided to a user's portable electronic device 104, to an inventory management system 302, and/or other parties and their associated devices.

In step 728, a user status message is generated indicating that the user is ready to receive the product. The user status message may be generated based on a user input (e.g., a check-in upon arrival), a status condition (e.g., a user's geographical location), and/or any other suitable criteria (e.g., a timeout or the user or an account reaching a preset limit). In step 730, the user status message is transmitted to the shopping facility. In some embodiments, the commerce infrastructure 110 transmits the user status message to an inventory management system 302 via a transceiver of the commerce infrastructure 110. The inventory management system 302 may utilize the user status message for any suitable purpose including to release the product to the customer and/or to alert the shopping facility to prepare the product for delivery (e.g., by retrieving it from a warehouse).

Figure 8:
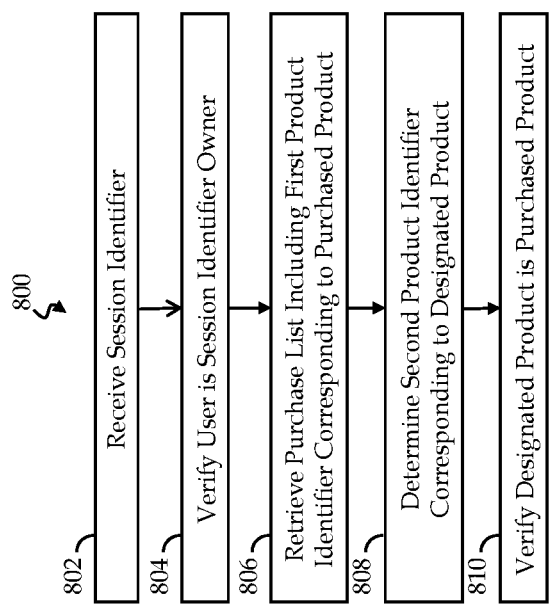
FIG. 8 is a flowchart of a method for verifying purchases according to aspects of the present disclosure.

FIG. 8 is a flowchart of a method for verifying purchases according to aspects of the present disclosure. Additional steps may be performed before, during, and/or after the method 800 and some of the steps described may be removed or replaced in alternate embodiments of the method 800. In step 802, a session identifier is received by an inventory management system 302. In some embodiment, the session identifier is received from a portable electronic device 104. In some embodiments, user input is collected using an input device incorporated into the inventory management system 302. Exemplary methods for collecting input include polling a keyboard, a mouse, a touchscreen, a biometric reader, a magnetic stripe reader, and/or other user input devices.

In step 804, a user is verified to determine whether the user is the legitimate owner of the session identifier. In various embodiments, user input is collected corresponding to public and/or private authentication data such as a user name, an account name, a passcode, a pattern, a biometric sample, an audio sample, an image and/or other suitable authentication code. The authentication data is then checked against an authoritative record.

In step 806, the session identifier is used to retrieve a purchase list. In some embodiments, the inventory management system 302 retrieves the purchase list by querying an inventory tracking database using the session identifier. The query returns the purchase list. The purchase list may contain a first product identifier corresponding to a purchased product. Exemplary product identifiers include stock codes, serial numbers, product codes such as universal purchase codes (UPC) as well as other identifiers. In some embodiments, the product identifier's inclusion on the purchase list indicates that the owner of the session identifier has purchased the corresponding product.

In step 808, a designated product is analyzed to determine a second product identifier corresponding to the designated product. In some embodiments, the inventory management system 302 monitors an area such as a store exit. The inventory management system 302 analyzes designated products as they approach the exit. In some embodiments, analysis includes scanning an RFID tag attached or in proximity to the designated product. In some embodiments, an inventory monitor incorporated into the inventory management system 302 scans an optical code such as a linear code (1*d* barcode) or a matrix code (2*d* barcode) attached or in proximity to the designated product. In some embodiments, the inventory monitor images the designated product and determines the second product identifier based on the image. The inventory monitor may utilize other suitable methods as well including taking physical measurements of attributes such as size and weight of the designated product.

In step 810, the second product identifier is compared against the first product identifier to verify that the designated product is the purchased product. The verification can then be used for a variety of purposes. For example, the designated product may be released to the purchaser based on a successful verification.

Figure 9:
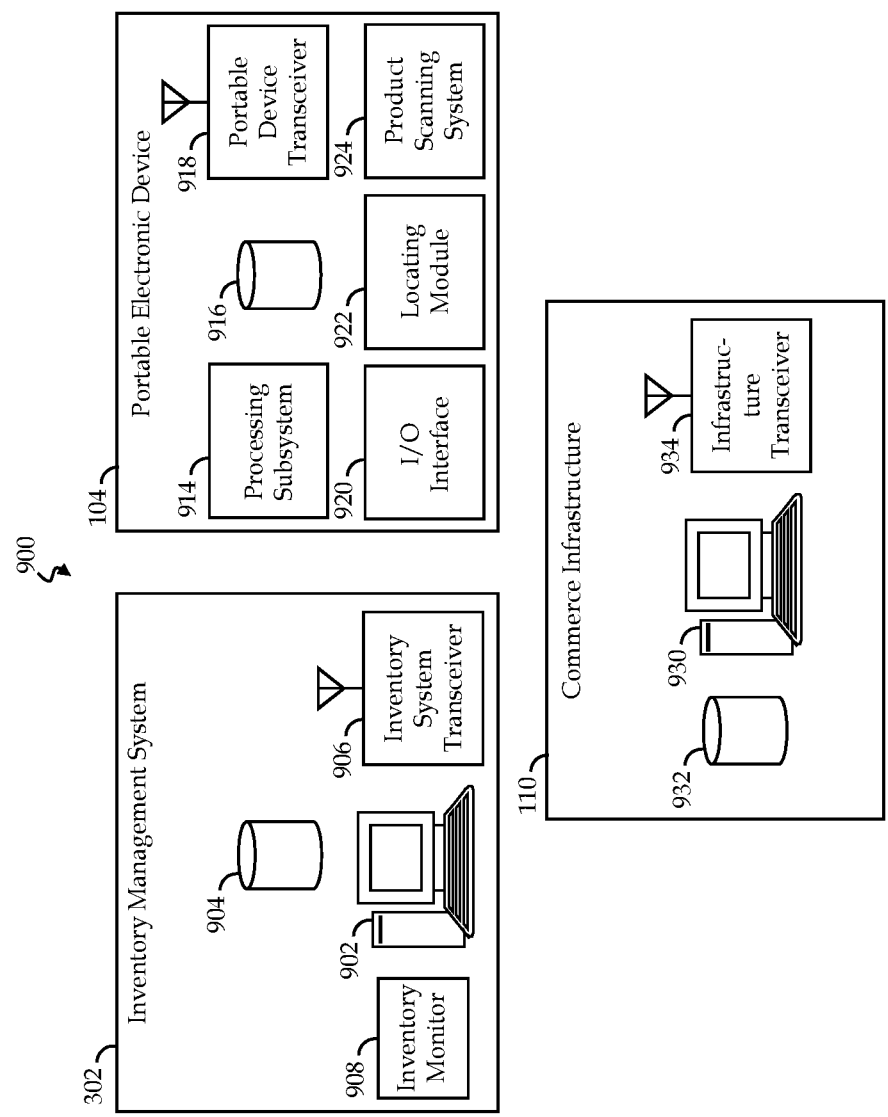
FIG. 9 is a schematic diagram illustrating a commercial system for making and verifying purchases according to aspects of the present disclosure.

FIG. 9 is a schematic diagram illustrating a commerce system 900 for making and verifying purchases according to aspects of the present disclosure. The system 900 may include an inventory management system 302, one or more portable electronic devices 104, and/or a commerce infrastructure 110. In the illustrated embodiment, the inventory management system 302 includes a computing system 902, an inventory tracking database 904, a transceiver 906, and an inventory monitor 908.

In accordance with various embodiments of the present disclosure, the computing system 902 includes a computational resource (e.g., a computer processor, a microcontroller, a digital signal processor, etc.), either alone or in a configuration such as a network server, a server cluster, a personal computer, a laptop, a tablet, a mobile cellular phone, etc., and may also include a bus component or other communication mechanisms for communicating information, a system memory component (e.g., RAM), a static storage component (e.g., ROM), a disk drive component (e.g., a magnetic or optical storage device), a network interface component (e.g., a modem, a wired network interface card, a wireless network transceiver, etc.), a display component (e.g., a cathode ray tube (CRT) or liquid crystal display (LCD)), an input component (e.g., a keyboard or touchscreen), a cursor control component (e.g., a mouse or trackball), and/or an image capture component (e.g., an analog or digital camera). In one implementation, the disk drive component comprises a data store constructed of one or more storage devices.

In accordance with embodiments of the present disclosure, the computing system 902 performs specific operations by executing one or more sequences of one or more instructions using the computational resource. Data including the instructions and associated results may be stored in a system memory component before, during, and after execution. Such data may be read into and out of the system memory component from another computer readable medium, such as a static storage component or a disk drive component. In some embodiments, hard-wired circuitry supplements and/or replaces software instructions to implement the present disclosure.

System behavior including that defined by the instructions may be encoded in a computer readable medium, which refers to any medium that participates in providing instructions to the processor for execution. Some common forms of computer readable media include, for example, floppy disks, flexible disks, hard disks, magnetic tapes, any other magnetic media, CD-ROMs, DVD-ROMs, any other optical media, punch cards, paper tapes, any other physical media with patterns of holes, RAM, PROM, EPROM, FLASH-EPROM, any other memory chips or cartridges, carrier waves, or any other media from which a computer is adapted to read. Such a medium may take many forms, including but not limited to, non-volatile media and volatile media. In one embodiment, the computer readable medium is non-transitory. In some embodiments, instructions, data, and related information are transmitted to the computing system 902 via a transmission medium. Exemplary wireless transmission media may take the form of radio-frequency, acoustic, or light waves, including those generated during radio wave and infrared data communications. Exemplary wired transmission media may include coaxial cables, copper wire, and fiber optics, including wires that comprise a bus.

In various embodiments of the present disclosure, the computing system 902 executes instruction sequences to practice the present disclosure, either in whole or in part. In various other embodiments of the present disclosure, a plurality of computer systems coupled by a communication link (e.g., a communications network, such as a LAN, WLAN, PTSN, and/or various other wired or wireless networks, including telecommunications, mobile, and cellular phone networks) and operating in coordination perform instruction sequences in order to practice the present disclosure.

The inventory management system 302 may also include an inventory tracking database 904, which can be accessed by the computing system 902. An exemplary inventory tracking database 904 includes a collection of electronic records stored on one or more computer-readable storage devices such as magnetic, solid-state, and/or optical memory stores as well as transitory memory stores (e.g., RAM). In some embodiments, the inventory tracking database 904 includes one or more records containing products associated with a session ID. Associating a product with a session ID in a record may indicate that the ID owner is considering the product for purchase, may indicate that the product has been purchased by the owner of the session ID, and/or may convey other information about the product or purchaser. In addition to containing information about the product and session ID, records in the inventory tracking database 904 may contain a purchase price, related products purchased at the same time, past purchases, customer demographics, and/or other relevant commercial information.

In the illustrated embodiment, the inventory management system 302 also includes a transceiver 906 communicatively coupled to the computing system 902. The transceiver 906 relays communications between the portable electronic device 104 and the inventory management system 302 including components therein such as the computing system 902. The transceiver 906 may be a wireless transceiver, a wired transceiver, and/or a combination thereof. Various embodiments having a wireless transceiver 906 utilize any suitable wireless communications architecture including IEEE 802.11 (Wi-Fi), a cellular networking architecture such as 1G, 2G, 3G, WiMAX, and LTE, Wireless USB, Bluetooth, ultrasound, infrared, and/or other suitable wireless architectures. In some embodiments, the transceiver 906 interfaces with a network beyond the inventory management system 302 such as an external LAN, WLAN, or WAN. In one such embodiment, the transceiver 906 interfaces with the Internet. In some embodiments, the external network is used as an intermediary to carry communications between the inventory management system 302 and the portable electronic device 104.

The inventory management system 302 also includes an inventory monitor 908. In various embodiments, the inventory monitor 908 detects, analyzes, and/or identifies products for sale. Products include physical goods, digital goods, intangibles such as services, and any other item of value. The inventory monitor 908 is capable of recognizing products by determining an identifying feature of a product. In some embodiments, the inventory monitor is a radio frequency identification (RFID) reader. RFID systems utilize radio-frequency emissions to detect and identify RFID sensor tags. For example, powered RFID tags emit radio-frequency signals that are received by the RFID reader and can be used to identify the RFID tag. Powered RFID tags incorporate an integrated power source and may not require the reader to include a transmitter. As a further example, passive RFID tags rely on the RFID reader to provide power via a transmission such as a radio-frequency signal generated by the reader. The radio-frequency signal generated by the reader powers an identifying response from the RFID tag. Thus in some embodiments, the inventory monitor 908 includes an RFID receiver and a transmitter. In some embodiments, the inventory monitor 908 includes an optical scanner. In some such embodiments, the optical scanner is configured to detect optical codes in a format such as a linear code standard (1*d* barcode) or a matrix code standard (2*d* barcode) including UPCA, QR Code® (a trademark of Denso Wave Inc.), Data Matrix, and/or PDF417. The inventory monitor 908 may include an imaging system such as a digital camera either alone or in combination with an image recognition processor. Images captured by the imaging system may be analyzed to identify a product. In some embodiments, the inventory monitor 908 correlates two or more identifying features such as an RFID tag with a product weight or an optical code with a physical size and shape in order to verify the identification.

The inventory management system 302 may use the inventory monitor 908 to control the flow of products. In an exemplary embodiment, the inventory management system 302 receives a confirmation of a purchase via the transceiver 906. The computing system 902 records the confirmation in the inventory tracking database 904. When the purchasing customer approaches the inventory monitor 908 with the purchased product, the monitor 908 scans the product to verify that it was purchased. The identification of the product is checked against the purchase recorded by the computing system 902. Once the product is verified, the customer is allowed to leave with the purchase.

A portable electronic device 104 in communication with the inventory management system 302 allows a customer to interface with the system 302. Portable electronic devices 104 take many forms. In some embodiments, the portable electronic device 104 is characterized by cellular connectivity and may be referred to as a cellular or cell phone. One example is a smart phone. In some embodiments, the portable electronic device 104 may be another suitable electronic device such as a computer tablet or a laptop. In various embodiments, the portable electronic device 104 includes a processing subsystem 914, a memory subsystem 916 which may comprise a system memory component (e.g., RAM) and/or a static storage component (e.g., FLASH storage, magnetic storage, and/or ROM), a network interface component or transceiver 918 (e.g., a cellular transceiver, a wireless networking transceiver, an ultrasound transceiver, an infrared transceiver, etc.) and an I/O interface 920 comprising a display component (e.g., a liquid crystal display or audio interface for the visually impaired) and/or an input component (e.g., touchscreen, keyboard, or mouse). In some embodiments, the device 104 may also include a locating module 922 such as a global positioning system (GPS). The portable electronic device 104 may be loaded with Application Software programs, also known as "apps." In general, apps are computer software programs designed to control the behavior of the portable electronic device 104 in order to execute specific tasks.

In some embodiments, the portable electronic device 104 includes a product scanning system 924 configured for product recognition. The scanning system 924 may be an RFID reader for scanning active and/or passive RFID tags, an optical scanner such as a visible laser optical code scanner, an imaging system such as a digital camera, and/or any other suitable imaging system. In some embodiments, the scanning system 924 includes an image recognition system that receives an image and extracts identifying information. In one such embodiment, the scanning system 924 exposes an optical code to laser emissions, records received reflections, and uses the image recognition system to identify the optical code from the recorded reflections. In another such embodiment, the scanning system 924 creates a digital image of a product using a digital camera and processes the image using the image recognition system to locate and recognize a distinguishing product characteristic such as an identifying code, a size, a shape, or a pattern on the packaging.

The portable electronic device 104 interfaces with the inventory management system 302. In some embodiments, the portable electronic device 104 interfaces with the transceiver 906 of the inventory management system 302 directly via a predetermined medium. In other embodiments, the portable electronic device 104 utilizes an intermediary network such as a cellular communications network, a wireless local-area network, an ad hoc ultrasound network, and/or the Internet. In various embodiments, the portable electronic device 104 allows a customer to view product information, make purchases, manage accounts, pick up purchases, and/or perform other transactions by communicating with the inventory management system 302. In some embodiments, the customer can perform these transactions and others while visiting the store. In some embodiments, the customer can perform these transactions from a remote location such as at the customer's home.

The system 900 may also include a commerce infrastructure 110 in communication with the inventory management system 302 and the portable electronic devices 104. In the illustrated embodiment, the commerce infrastructure 110 includes a computing system 930, a memory storage system storing a transaction database 932, and a transceiver 934. In various embodiments, the computing system 930 takes the form of one or more of a network server, a server cluster, a personal computer, a laptop, a tablet, a mobile cellular phone, etc. The computing system 930 may include a computational resource (e.g., a computer processor, a microcontroller, a digital signal processor, etc.) and may also include a bus component or other communication mechanisms for communicating information, a system memory component (e.g., RAM), a static storage component (e.g., ROM), a disk drive component (e.g., a magnetic or optical storage device), a network interface component (e.g., a modem, a wired network interface card, a wireless network transceiver, etc.), a display component (e.g., a cathode ray tube (CRT) or liquid crystal display (LCD)), an input component (e.g., a keyboard or touchscreen), a cursor control component (e.g., a mouse or trackball), and/or an image capture component (e.g., an analog or digital camera). In one implementation, the disk drive component comprises a data store constructed of one or more storage devices.

In accordance with embodiments of the present disclosure, the computing system 930 performs specific operations by executing one or more sequences of one or more instructions using the computational resource. Data including the instructions and associated results may be stored in a system memory component before, during, and after execution. Such data may be read into and out of the system memory component from another computer readable medium, such as a static storage component or a disk drive component.

System behavior including that defined by the instructions may be encoded in a computer readable medium, which refers to any medium that participates in providing instructions to the processor for execution. Some common forms of computer readable media include, for example, floppy disks, flexible disks, hard disks, magnetic tapes, any other magnetic media, CD-ROMs, DVD-ROMs, any other optical media, punch cards, paper tapes, any other physical media with patterns of holes, RAM, PROM, EPROM, FLASH-EPROM, any other memory chips or cartridges, carrier waves, or any other media from which a computer is adapted to read. Such a medium may take many forms, including but not limited to, non-volatile media and volatile media. In one embodiment, the computer readable medium is non-transitory. In some embodiments, instructions, data, and related information are transmitted to the computing system 930 via a transmission medium. Exemplary wireless transmission media may take the form of radio-frequency, acoustic, or light waves, including those generated during radio wave and infrared data communications. Exemplary wired transmission media may include coaxial cables, copper wire, and fiber optics, including wires that comprise a bus. In some embodiments, hard-wired circuitry supplements and/or replaces software instructions to implement the present disclosure.

The commerce infrastructure 110 may also include a transaction database 932, which can be accessed by the computing system 930. In some embodiments, the transaction database 932 includes transaction information such as user information, product information, purchase information, and session IDs stored on one or more computer-readable storage devices such as magnetic, solid-state, and/or optical memory stores as well as transitory memory stores (e.g., RAM). In some embodiments, the transaction database 932 includes one or more records containing products associated with a session ID. Associating a product with a session ID in a record may indicate that the ID owner is considering the product for purchase, may indicate that the product has been purchased by the owner of the session ID, and/or may convey other information about the product or purchaser. In addition to containing information about the product and session ID, records in the transaction database 932 may contain a purchase price, related products purchased at the same time, past purchases, customer demographics, and/or other relevant commercial information.

The commerce infrastructure 110 may also include a transceiver 934 communicatively coupled to the computing system 930. The transceiver 934 establishes communications between the portable electronic device 104 and the inventory management system 302. The transceiver 934 may be a wireless transceiver, a wired transceiver, and/or a combination thereof. Various embodiments having a wireless transceiver 934 utilize any suitable wireless communications architecture including IEEE 802.11 (Wi-Fi), a cellular networking architecture such as 1G, 2G, 3G, WiMAX, and LTE, Wireless USB, Bluetooth, ultrasound, infrared, and/or other suitable wireless architectures. In some embodiments, the transceiver 934 interfaces with an external network such as an external LAN, WLAN, or WAN. In one such embodiment, the transceiver 934 interfaces with the Internet. In some embodiments, the external network is used as an intermediary to carry communications between the commerce infrastructure 110, the inventory management system 302 and the one or more portable electronic devices 104.

Figure 10:
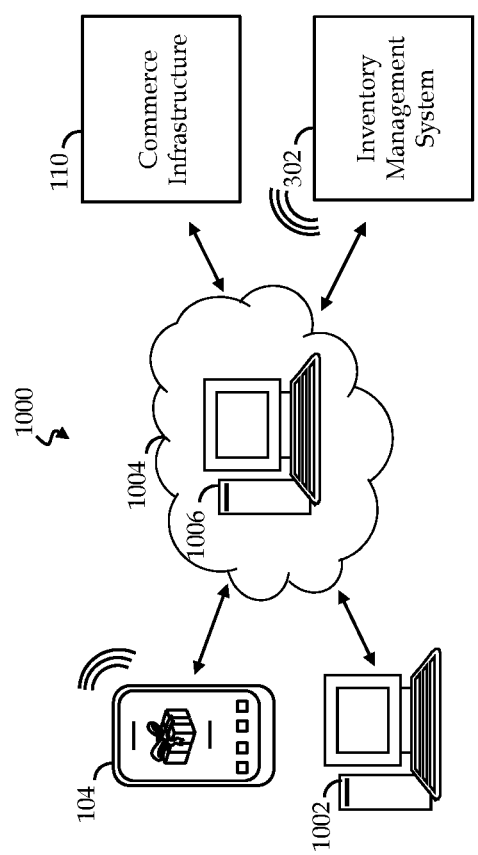
FIG. 10 is a schematic diagram illustrating a cloud-based computing architecture which may be used to implement various aspects of the present disclosure.

FIG. 10 is a schematic diagram illustrating a cloud-based computing architecture 1000 which may be used to implement various aspects of the present disclosure. The cloud-based computing architecture 1000 includes a portable electronic device 104, a commerce infrastructure 110, an inventory management system 302, and other computing devices 1002, connected to a computer network 1004 (e.g., a LAN, a WAN, an intranet, the Internet, etc.), which may incorporate one or more cloud-based resources 1006. The cloud-based resources 1006 may include one or more computers, such as server computers, with adequate memory resources to handle requests from a variety of users. The flexibility of the cloud architecture allows the cloud-based resources 1006 to assume some or all of the functionality of the connected devices such as the functionality described above with reference to FIGS. 1-8.

For example, circuitry within portable electronic device 104 may capture user input and display user output while a cloud-based resource 1006 may perform calculations on behalf of the device 104, may store data on behalf of the device 104, may coordinate communications with the inventory management system 302, and/or may perform other steps normally associated with the device 104. In one such embodiment, the cloud-based resource 1006 associates a product with a session ID as disclosed with reference to step 514 of FIG. 5. In another such embodiment, the cloud-based resource generates a user status message as disclosed with reference to step 518 of FIG. 5. In other examples, the cloud-based resources 1006 assume functionality of the inventory management system 302. In further examples, the cloud-based resources 1006 assume functionality of the commerce infrastructure 110. Other divisions of capabilities and functionality are possible in various other embodiments.

It is understood that the various components of cloud-based computing architecture 1000 are shown as examples only. For instance, a given user may access the cloud-based resources 1006 by a number of devices, not all of the devices being mobile devices. Similarly, a merchant or another user may access resources 1006 from any number of suitable mobile or non-mobile devices. Furthermore, the cloud-based resources 1006 may accommodate many users and sellers and thus many portable electronic devices 104, commerce infrastructures 110, and inventory management systems 302 in various embodiments.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

Some embodiments of the present disclosure involve a commerce infrastructure system comprising: a transaction database configured to store transaction information and one or more computer processors in communication with the transaction database. The one or more computer processors are configured to perform: receiving user information indicating the beginning of a shopping session; generating a session identifier corresponding to the shopping session and a user identified by the user information; receiving a selection of a product; associating the product with the session identifier; and notifying an electronic shopping system of the associating of the product with the session identifier.

In some such embodiments, the one or more computer processors are further configured to perform the notifying of the electronic shopping system on a real-time basis.

In some such embodiments, the one or more computer processors are further configured to perform an operation of verifying an identity of the user, and the associating of the product with the session identifier is performed when the identity of the user is verified.

In some such embodiments, the one or more computer processors are further configured to perform: receiving an image from a product scanning system sensor, the image containing product information; determining an identifying characteristic from the image; and correlating the identifying characteristic with the product.

In some such embodiments, the one or more computer processors are further configured to perform: obtaining a price for the product; coordinating payment for the product; and receiving a confirmation of the payment.

In some such embodiments, the one or more computer processors are further configured to perform an operation of verifying an identity of the user; and the coordinating of payment is performed when the identity of the user is verified.

In some such embodiments, the one or more computer processors are further configured to perform an operation of transmitting a status message indicating that the user is ready to receive the product to the electronic shopping system.

In some such embodiments, the status message is generated in response to a physical location of the user.

Some embodiments of the present disclosure involve a method of shopping comprising: receiving user information signifying the start of a shopping session; receiving an electronic session identifier corresponding to the shopping session and a user identified by the user information; determining a selection of a product of a shopping facility; associating the product with the session identifier in response to the determining of the selection; and notifying the shopping facility of the associating of the product with the session. The receiving of the user information, the receiving of the electronic session identifier, the determining, the associating, and the notifying are each performed by a computing system.

In some such embodiments, the notifying is performed on a real-time basis.

In some such embodiments, the receiving of the electronic session identifier includes generating the electronic session identifier.

In some such embodiments, the notifying includes providing, to an electronic database of the shopping facility, the session identifier and a product identifier corresponding to the product associated with the session identifier.

In some such embodiments, the method further comprises verifying an identity of the user, and wherein the associating of the product with the session identifier is performed when the identity of the user is verified.

In some such embodiments, the method further comprises: receiving an image containing product information; determining an identifying characteristic from the product information; and correlating the identifying characteristic with the product.

In some such embodiments, the method further comprises: obtaining a price for the product; coordinating payment for the product; and receiving a confirmation of payment for the product.

In some such embodiments, the method further comprises verifying an identity of the user, and the coordinating of the payment is performed in response to the verifying of the identity of the user.

In some such embodiments, the method further comprises: receiving a status of the user indicating that the user is ready to receive the product; and notifying the shopping facility in response to the receiving of the status.

In some such embodiments, the receiving of the status includes receiving a geographical location of the user.

In some such embodiments, the receiving of the status includes receiving a check-in request from the user.

Further embodiments of the disclosure involve an apparatus comprising a non-transitory, tangible machine-readable storage medium storing a computer program, wherein the computer program contains machine-readable instructions. When executed electronically by processors, the instructions perform: determining a session identifier corresponding to a shopping session; determining a selection of a product; creating an electronic record linking the product and the session identifier in response to the determining of the selection; and transmitting the electronic record to an electronic shopping system.

In some such embodiments, the computer program contains further instructions that, when executed, perform verifying an identity of a user; and the creating of the electronic record is performed based on the identity of the user.

In some such embodiments, the computer program contains further instructions that, when executed, perform: receiving an image containing product information; determining an identifying characteristic from the image; and correlating the identifying characteristic with the product.

In some such embodiments, the computer program contains further instructions that, when executed, perform:

obtaining a price for the product; coordinating payment for the product; and receiving a confirmation of the payment.

In some such embodiments, the computer program contains further instructions that, when executed, perform determining an acceptance of payment terms.

In some such embodiments, the computer program contains further instructions that, when executed, perform providing the confirmation of payment to the electronic shopping system.

In some such embodiments, the computer program contains further instructions that, when executed, perform transmitting a status message indicating that the user is ready to receive the product to the electronic shopping system.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing instructions; and
   one or more hardware processors coupled to the non-transitory memory and configured to read the instructions from the non-transitory memory to cause the system to perform operations comprising:
   generating a session identifier for a shopping session of a user based on a hash that is derived from a merchant location and at least one other value associated with the shopping session;
   creating an association between a user selected product from the shopping session and the session identifier;
   notifying the merchant location about the user selected product based on the association between the user selected product and the session identifier;
   identifying a merchant location account based on an identity of the merchant location obtained from the session identifier; and
   transferring funds from a user account to the merchant location account as payment for the user selected product.

2. The system of claim 1, wherein creating the association is based on a user's selection of the user selected product.

3. The system of claim 1, wherein the hash is based on a value associated with the shopping session and an identifier of the user.

4. The system of claim 1, wherein the operations further comprise receiving a confirmation of payment made from the user account to the merchant location account.

5. An electronic device comprising:
   a non-transitory memory storing executable instructions;
   a network interface component; and
   one or more hardware processors coupled to the non-transitory memory and the network interface component and configured to read the executable instructions from the non-transitory memory to cause the electronic device to perform operations comprising:
   receiving a session identifier associated with a shopping session of a user, the session identifier being generated based on a hash that is derived from a shopping location and at least one other value associated with the shopping session;
   notifying an electronic shopping system associated with the shopping location about a selected product from the shopping session based on the session identifier;
   identifying a shopping location account based on an identity of the shopping location obtained from the session identifier; and
   transmitting a payment request to a payment processing system to move funds from a user account to the shopping location account as payment for the selected product.

6. The electronic device of claim 5, wherein the operations further comprise:
   receiving a confirmation of payment from the user account to the shopping location account; and
   transmitting confirmation of payment to the electronic shopping system accessible at the shopping location.

7. The electronic device of claim 5, wherein the operations further comprise:
   generating a user status message indicating that the user is ready to receive the selected product when the user has arrived at the shopping location; and
   transmitting the user status message to the electronic shopping system associated with the shopping location.

8. The electronic device of claim 7, wherein the generating the user status message and the transmitting the user status message are performed when the user has arrived at a designated place within the shopping location.

9. The electronic device of claim 5, wherein operations further comprise:
   detecting a selection of the selected product; and
   associating the selected product with the session identifier.

10. The electronic device of claim 5, wherein the operations further comprise verifying an identity of the user before associating the selected product with the session identifier.

11. The electronic device of claim 5, wherein the at least one other value is at least one of an identifier of the user or a value corresponding to the shopping session.

12. A computer-implemented method comprising:
    receiving, by one or more hardware processors, a session identifier associated with a shopping session of a user, the session identifier being generated based on a hash that is derived from a shopping location and at least one other value associated with the shopping session;
    notifying an electronic shopping system associated with the shopping location about a selected product from the shopping session based on the session identifier;
    identifying a shopping location account based on an identity of the shopping location obtained from the session identifier; and
    transmitting a payment request to a payment processing system to move funds from a user account to the shopping location account as payment for the selected product.

13. The method of claim 12, further comprising:
    generating a user status message indicating that the user is ready to receive the selected product; and
    transmitting the user status message to an inventory management system associated with a shopping location to alert the shopping location that the user is ready to receive the selected product.

14. The method of claim 13, further comprising:
    detecting, by the one or more hardware processors, a geographic location of the user, and wherein the transmitting the user status message is performed in response to detecting that the geographic location indicates the user has arrived at the shopping location.

15. The method of claim 12, further comprising:
receiving a confirmation of payment from the user account to the shopping location account; and
transmitting the confirmation of payment to the electronic shopping system.

16. The method of claim 12, further comprising detecting a selection of a product by the user of a portable electronic device including the one or more hardware processors by scanning a radio frequency identification tag, scanning a barcode, or capturing an image of the product.

17. The method of claim 12, further comprising:
transmitting a session identifier generation trigger to an infrastructure system over a network; and
detecting, with a locating module in communication with the one or more hardware processors, a geographic location of the user, and
wherein the transmitting the session identifier generation trigger is performed when the locating module detects that the geographic location indicates the user has arrived at the shopping location.

18. The system of claim 1, wherein the generating the session identifier comprises generating multiple session identifiers in response to the shopping session being performed on multiple user devices, and wherein each of the multiple session identifiers uniquely identifies the shopping session being performed on a respective user device of the multiple user devices.

19. The system of claim 1, wherein the session identifier is generated in response to the user beginning an online shopping session while the user is located beyond a predetermined distance from the merchant location.

20. The system of claim 1, wherein the operations further comprise:
receiving a user status message indicating that the user is ready to receive the user selected product; and
alerting, in response to the received user status message, the merchant location to prepare the user selected product for in-store pick up by the user or for delivery to the user.

* * * * *